Nov. 12, 1940.  J. R. GAMMETER  2,221,323
APPARATUS AND METHOD FOR TESTING AND ASSORTING THIN RUBBER GOODS
Filed Aug. 22, 1938  9 Sheets-Sheet 1

Inventor
JOHN R. GAMMETER

By Ralph Barrow,
Attorney

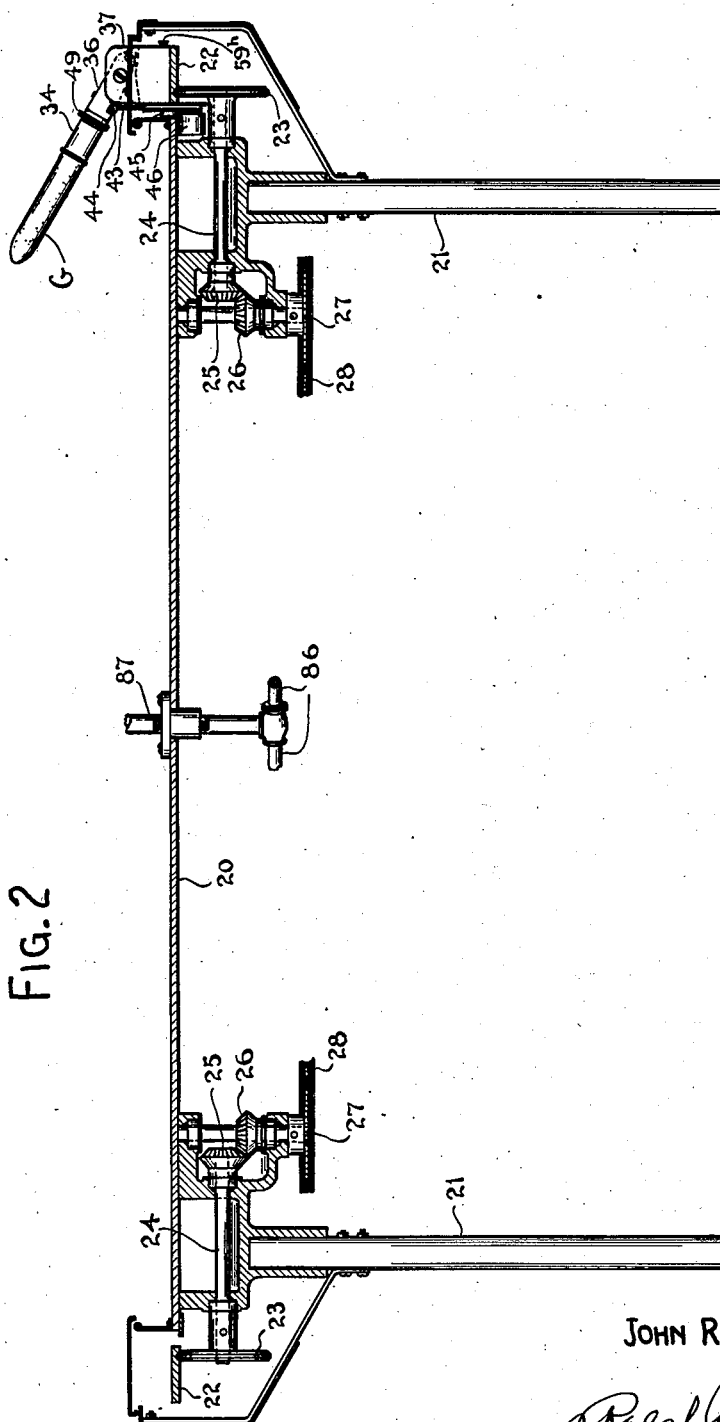

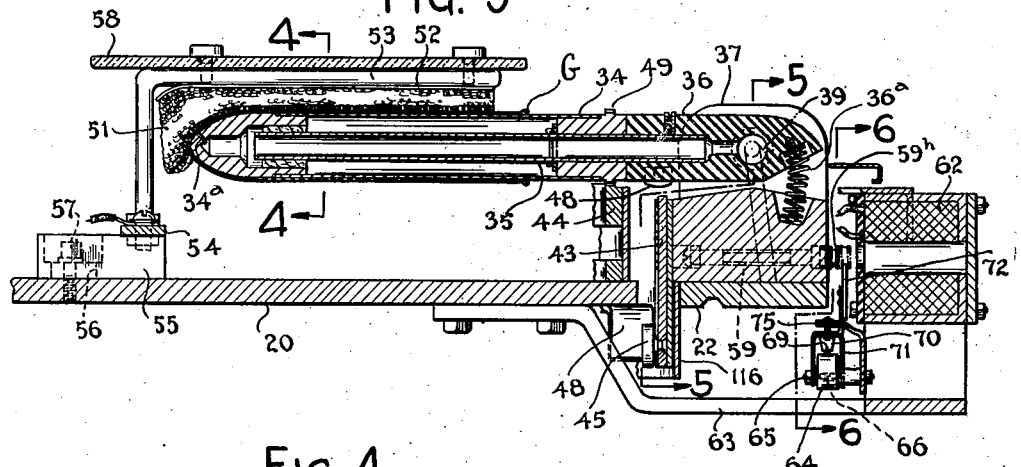
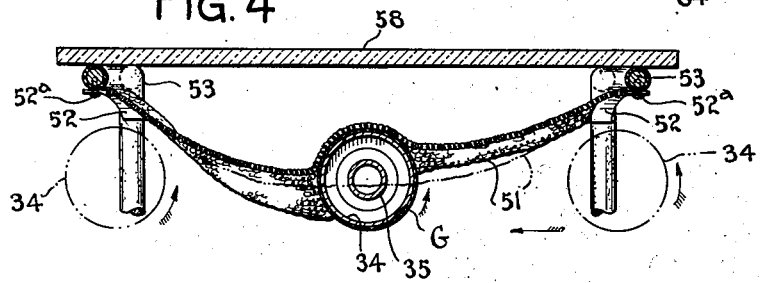
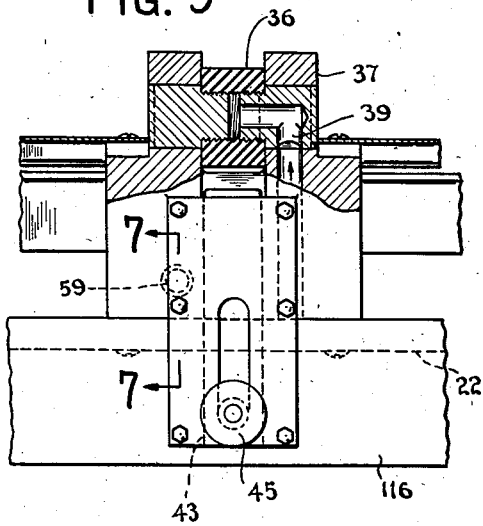
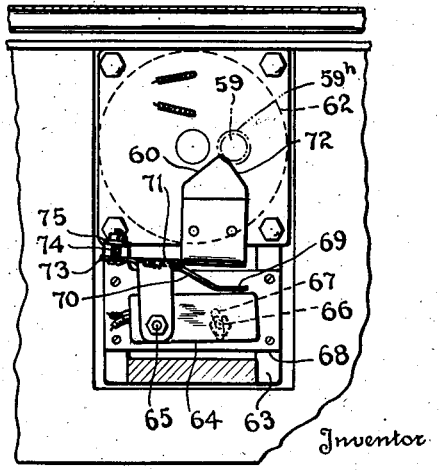

Nov. 12, 1940.　　　　J. R. GAMMETER　　　　2,221,323
APPARATUS AND METHOD FOR TESTING AND ASSORTING THIN RUBBER GOODS
Filed Aug. 22, 1938　　　9 Sheets-Sheet 4
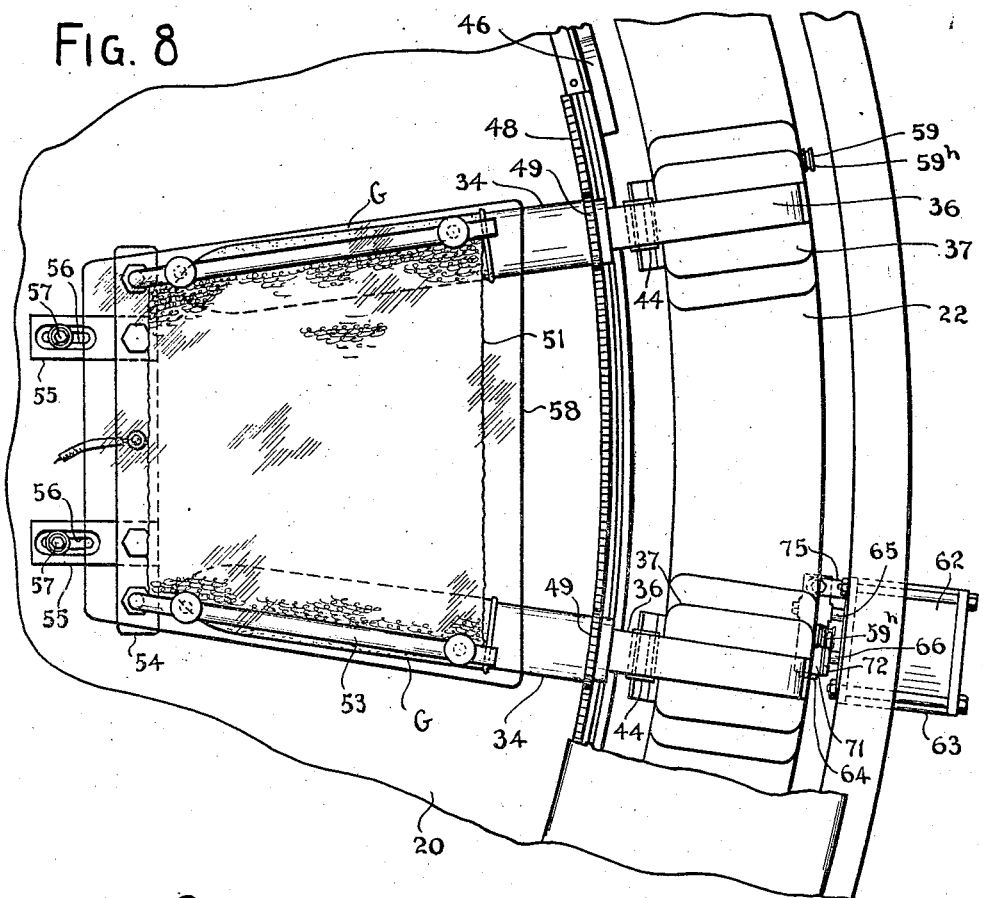
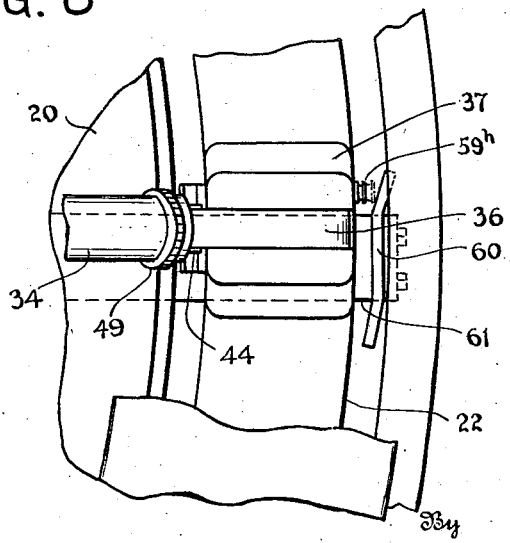
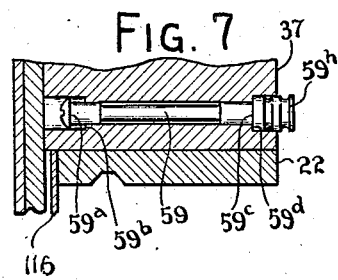
Inventor
JOHN R. GAMMETER Nov. 12, 1940.   J. R. GAMMETER   2,221,323
APPARATUS AND METHOD FOR TESTING AND ASSORTING THIN RUBBER GOODS
Filed Aug. 22, 1938   9 Sheets-Sheet 5

Inventor
JOHN R. GAMMETER
By Ralph Barrow
Attorney

Nov. 12, 1940.  J. R. GAMMETER  2,221,323
APPARATUS AND METHOD FOR TESTING AND ASSORTING THIN RUBBER GOODS
Filed Aug. 22, 1938  9 Sheets-Sheet 6

Inventor
JOHN R. GAMMETER
By J. Ralph Barrow,
Attorney

Nov. 12, 1940.   J. R. GAMMETER   2,221,323
APPARATUS AND METHOD FOR TESTING AND ASSORTING THIN RUBBER GOODS
Filed Aug. 22, 1938   9 Sheets-Sheet 7

Inventor
JOHN R. GAMMETER
By J. Ralph Barrows
Attorney

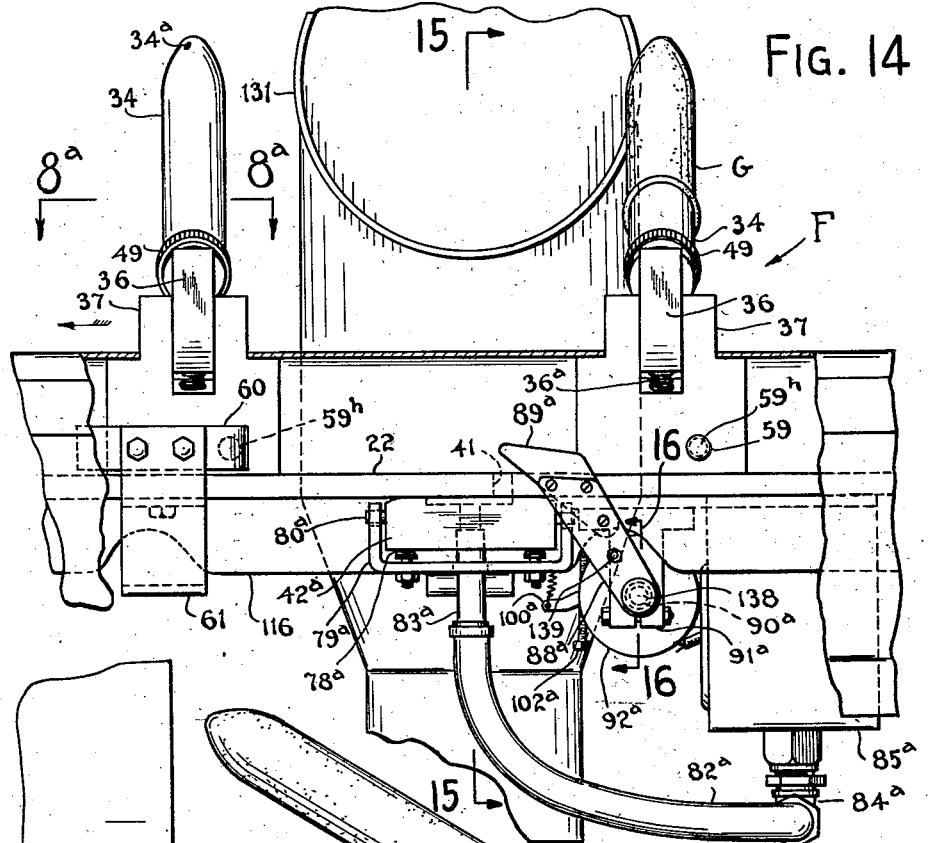
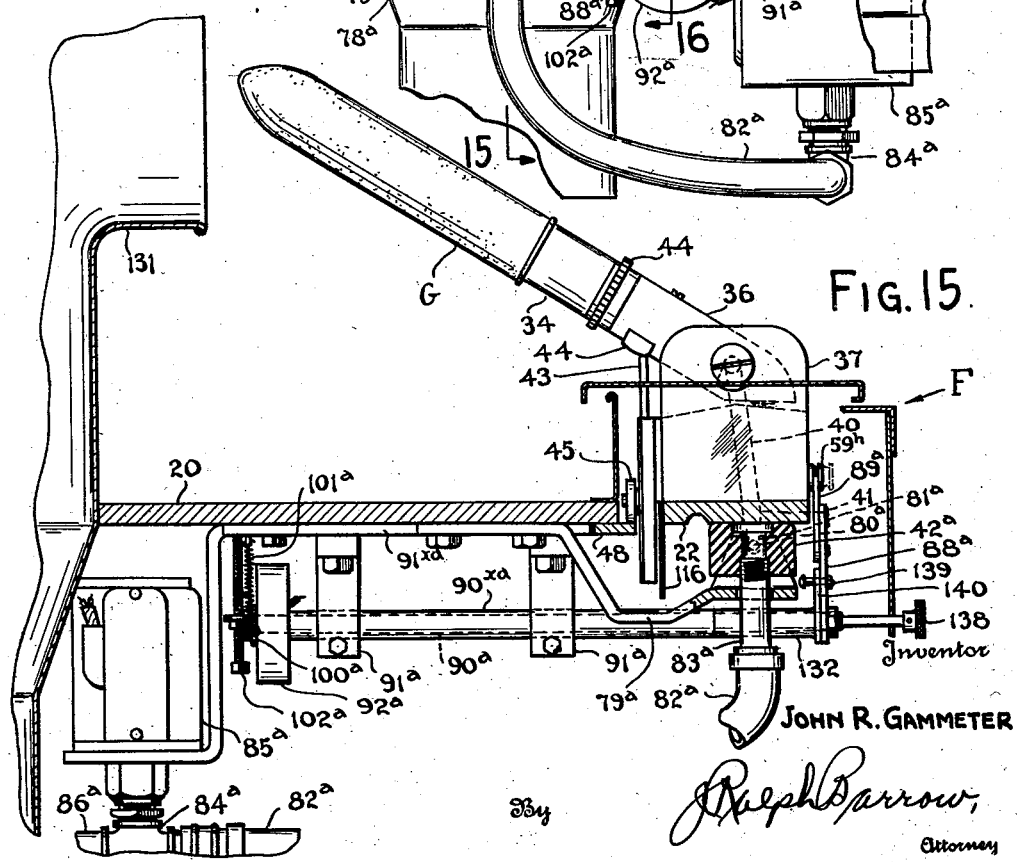

Inventor
JOHN R. GAMMETER

Patented Nov. 12, 1940

2,221,323

UNITED STATES PATENT OFFICE 2,221,323

APPARATUS AND METHOD FOR TESTING AND ASSORTING THIN RUBBER GOODS

John R. Gammeter, Akron, Ohio

Application August 22, 1938, Serial No. 226,112

9 Claims. (Cl. 209—81)

The invention herein disclosed relates to thin rubber goods, procedure and apparatus and particularly to testing of such goods and branding of such goods after manufacture, the particular embodiment of the invention being designed for testing, discarding defective goods and branding the perfect goods after manufacture thereof and before shipment. The invention, however, may comprise separate procedures and separate instrumentalities for the respective purposes stated.

One purpose of the invention is to provide an improved procedure and apparatus for testing thin rubber goods such as prophylactic rubber articles for imperviousness.

Another purpose of the invention is to provide improved procedure and apparatus for discarding defective goods.

Another purpose of the invention is to provide improved procedure and apparatus for branding the perfect goods.

Another purpose of the invention is to provide improved procedure and apparatus for delivering the tested or branded goods to a point for further treatment, packaging, etc.

The foregoing and other purposes of the invention are attained in and by use of the apparatus illustrated in the accompanying drawings and described below. It is to be understood that the invention is not limited to the specific form thereof shown and described.

Of the accompanying drawings:

Figure 2 is a section on line 2—2 of Figure 1;

Figure 3 is a section on line 3—3 of Figure 1;

Figure 4 is a section on line 4—4 of Figure 3;

Figure 5 is a section on line 5—5 of Figure 3;

Figure 6 is a section on line 6—6 of Figure 3;

Figure 7 is a section on line 7—7 of Figure 5;

Figure 8 is an enlarged plan of the device at a testing station;

Figure 1:
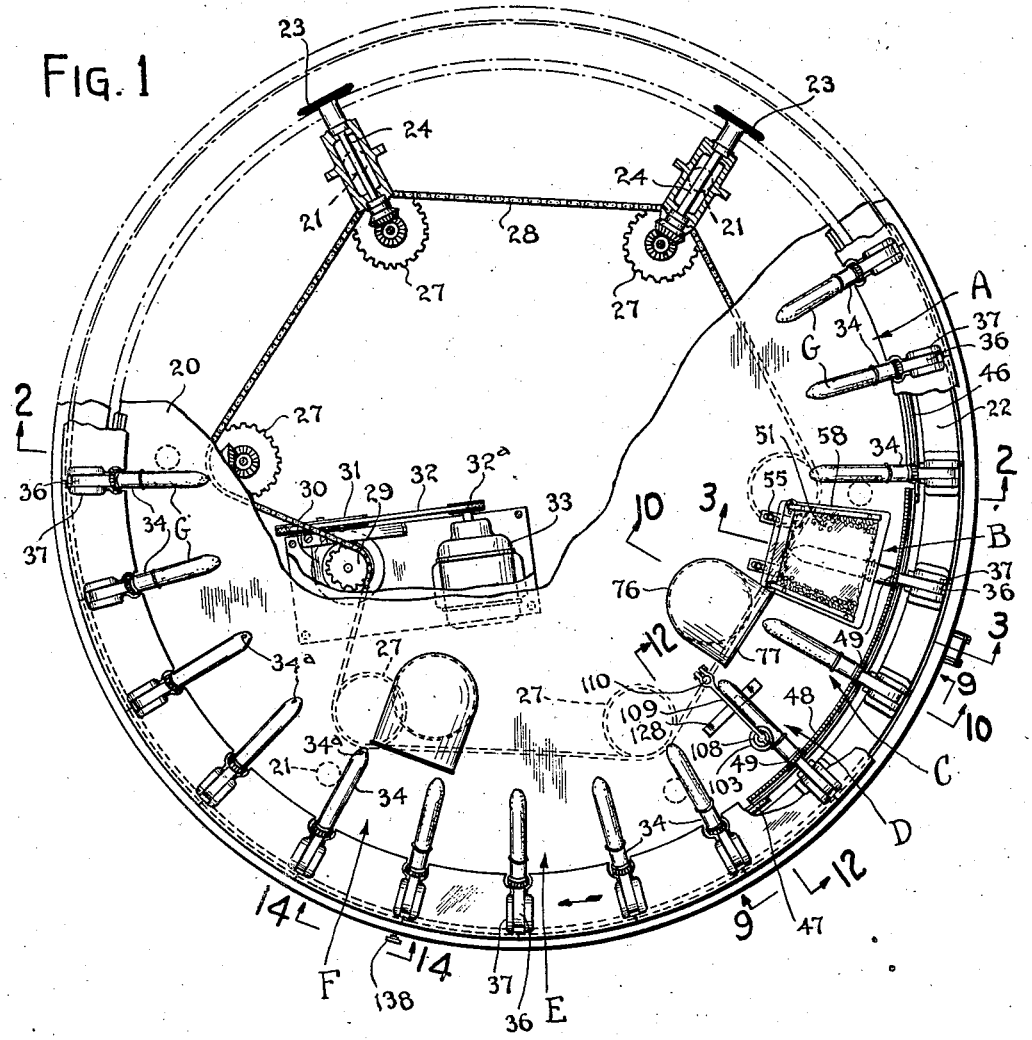
Figure 1 is a plan view, partly broken away and in section, of apparatus embodying and adapted to carry out the invention.
Figure 9:
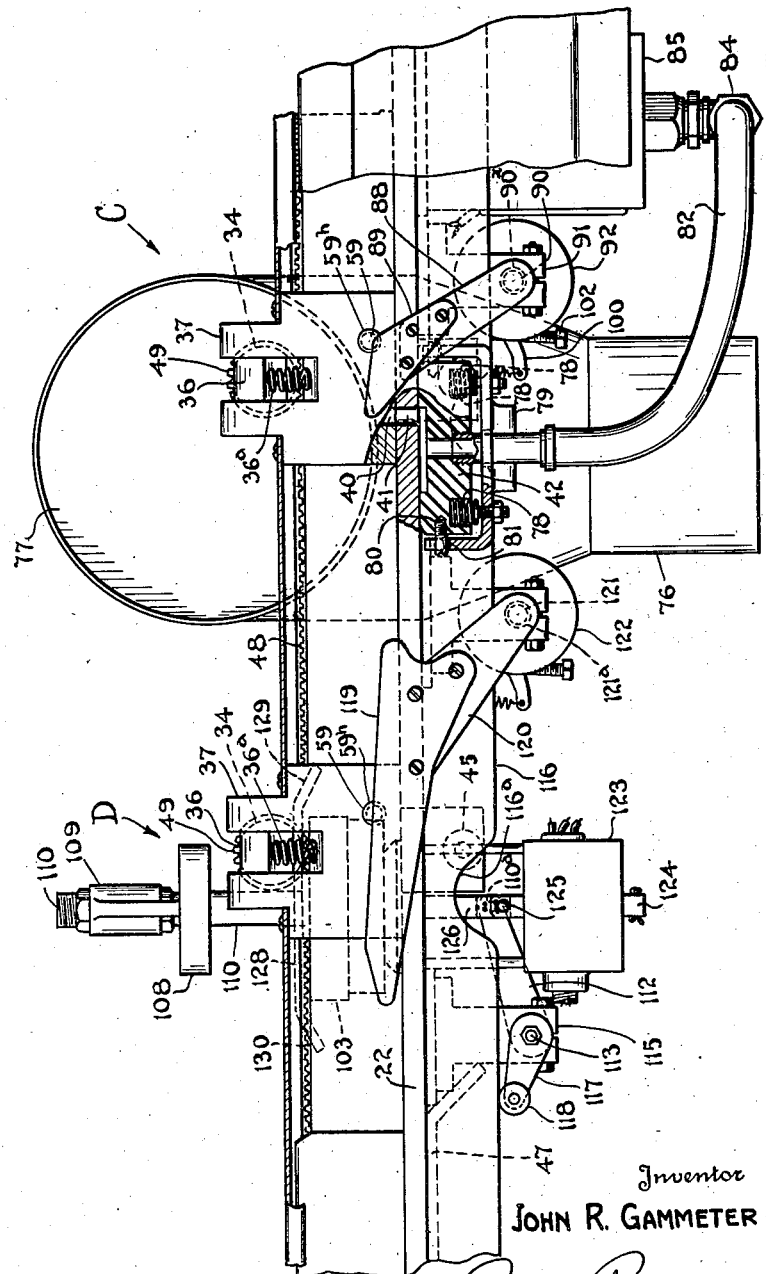
Figure 10:
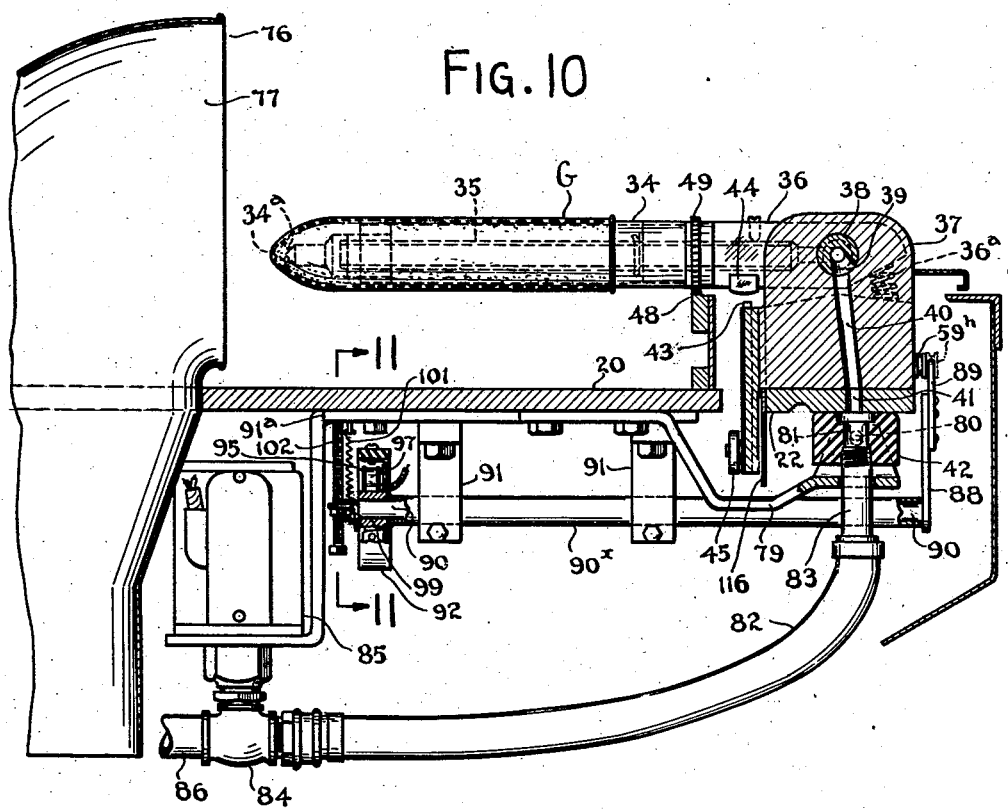
Figure 11:
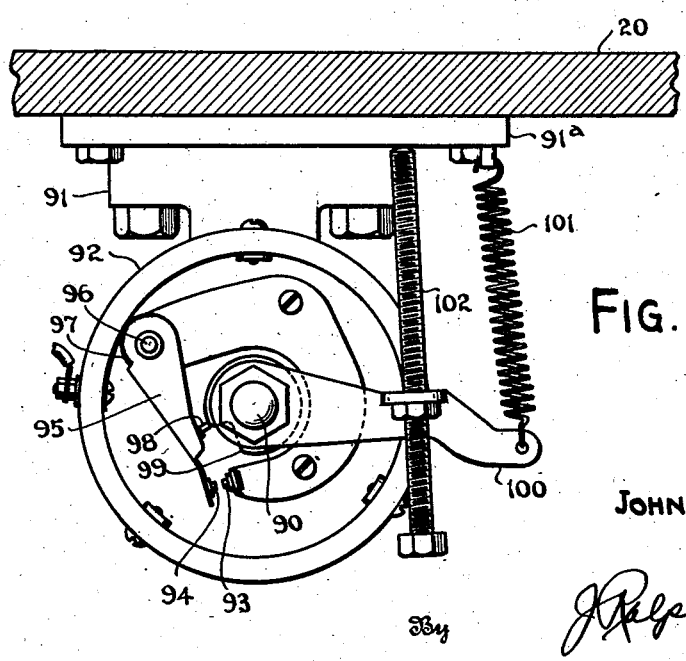
Figure 12:
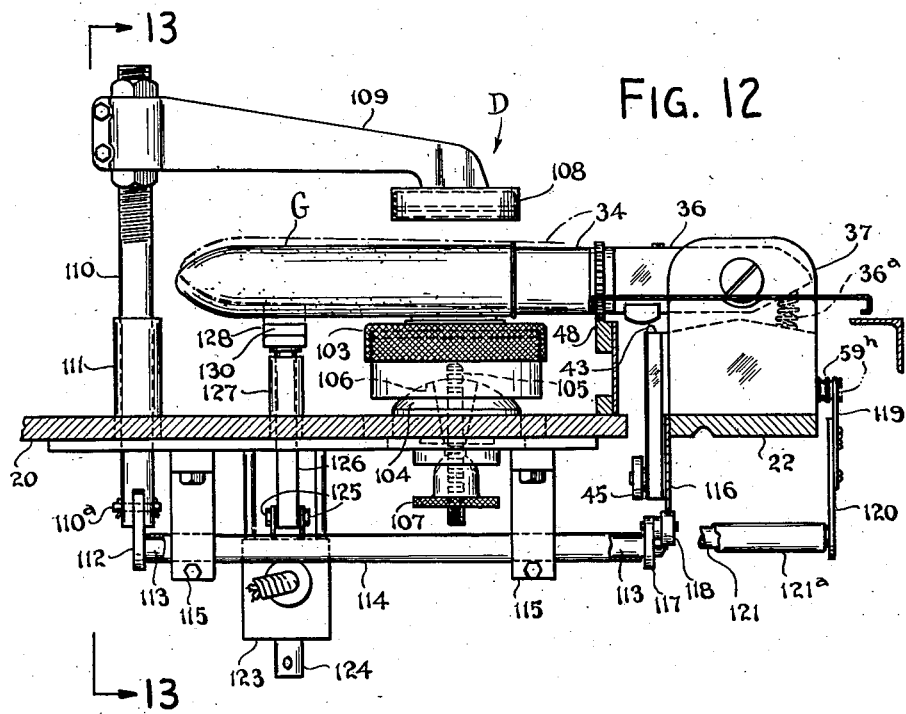
Figure 13:
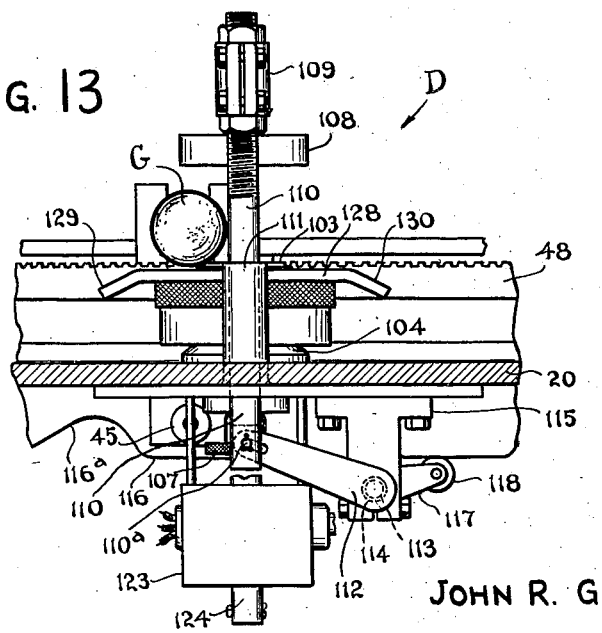
Figure 16:
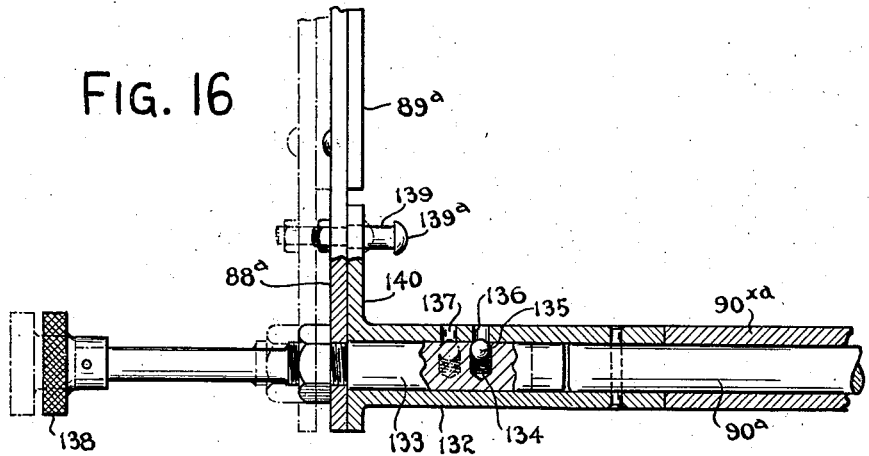

Figure 8ª is a view on line 8ª—8ª of Figure 14;

Figure 9 is a part elevation, partly in section, of the device at line 9—9 of Figure 1;

Figure 10 is a section on line 10—10 of Figure 1;

Figure 11 is a section on line 11—11 of Figure 10;

Figure 12 is a section on line 12—12 of Figure 1;

Figure 13 is a section on line 13—13 of Figure 12;

Figure 14 is a part elevation, partly in section, on line 14—14 of Figure 1;

Figure 15 is a section on line 15—15 of Figure 14;

Figure 16 is a section on line 16—16 of Figure 14; and

Figure 17:
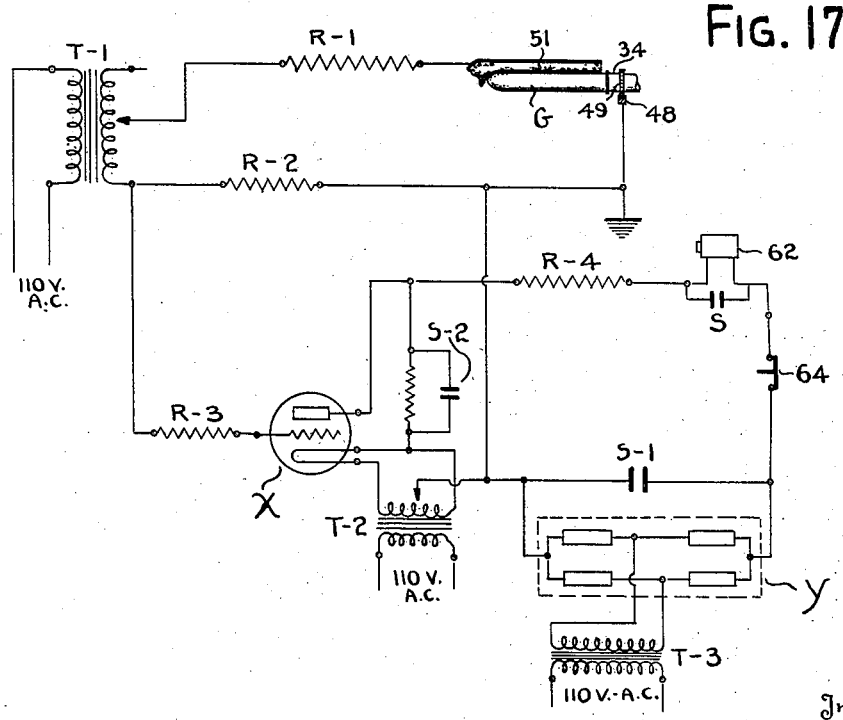

Figure 17 is an electrical and wiring diagram for the equipment.

Referring to the drawings, the numeral 20 designates a suitable table with legs 21, 21 and about the periphery of which is arranged an annulus 22 which is revolved about the table 20. The annulus 22 may be supported on driven rollers 23, 23 on shafts 24 journaled on the under side of the table 20 and driven by gears 25, 25 meshed with gears 26, 26 in turn driven by sprockets 27, 27 about which is trained a common driving chain 28. Chain 28 is trained about a driving sprocket 29 which is driven through a suitable reduction 30 driven by a pulley 31 over which is trained a belt 32 driven by the pulley 32ª on the shaft of a motor 33. This arrangement is such that annulus 22 will be continuously revolved about table 20 during use of the machine.

Annulus 22 carries thereon a circumferential series of equally spaced forms 34, 34 which are thereby arranged to be moved through several stations at which various operations are performed. The forms 34, as best shown in Figures 3 and 4, are so shaped as to receive the articles to be tested and to hold them in distended unwrinkled condition. A station is provided at A for applying to the forms goods to be tested. At station B is an electrical testing unit and device for manifesting a defective piece of goods so that it may be discarded. At station C there is provided apparatus for discarding the defective goods. At station D is apparatus for branding perfect tested goods. At station E perfect goods may be rolled off the forms 34 and at station F perfect tested goods may be automatically discharged from the machine and delivered to a point for further handling, packaging, etc. A second set of these stations (not shown) may be arranged at the opposite side of table 10 so that the single machine may be used for simultaneously testing, branding, etc., goods supplied thereto at two separate points.

The forms 34 are rotatably mounted on tubular spindles 35 which are secured in mountings 36 hinged on supports or brackets 37 mounted on annulus 22 whereby forms 34 may be swung between upwardly inclined positions as at station A (the right-hand side of Figure 2) and stations E and F and horizontal positions as at stations B, C and D, the forms being arranged to extend inwardly over the outer edge of table 20 for operation of the various testing, branding and other devices thereon as annulus 22 revolves. Springs 36ª may be utilized normally to urge the forms 34 downwardly to horizontal position (see Figure 3).

As best shown in Figure 10, the forms 34 which are hollow and having openings 34ª from the interior thereof to the outer surfaces at the tips of the forms (see Figure 3) and are so mounted that air under pressure may be supplied to the forms as at stations C and F for blowing the goods off the forms. To this end the tubular spindles 35 are each connected by tubular hinge pin 38 and duct 39 therein to a duct 40 with which duct 39 is in communication in all positions of forms 34. Duct 40 is in turn in communication with a duct 41 down through annulus 22 which is arranged to cooperate with air supply nozzle 42 or 42ª at stations C and F as will be later explained (see Figures 10 and 15).

For holding forms 34 upwardly as they pass through stations A, E and F, plungers 43, 43 are provided (Figure 10) which are vertically slidable in the hinge brackets 37 so that the upper ends thereof may engage buffers 44, 44 on the under side of mountings 36 (see Figure 15). The plungers 43 carry rollers 45 (see Figures 10 and 15) which ride on cam rails 46 and 47 which respectively extend through adjoining stations corresponding to E and F at the opposite side of table 20 and adjoining station A and through adjoining stations E and F as shown and the adjoining station opposite to and corresponding to station A, rails 46 and 47 being identical as will be apparent and being shaped to permit lowering of the forms as they pass to stations B, C, D and the corresponding stations (not shown) at the opposite sides of the table and being shaped to raise the forms and to hold them raised as they pass through stations E and F and the station opposite A and as they pass through stations opposite E and F and station A.

At stations B, C and D and opposite stations there is provided arcuate racks 48 for engaging gears 49 on forms 34 to revolve the forms as they pass through these stations.

At station A, the forms extend upwardly (see Figure 2) and there are no instrumentalities here which directly cooperate with the forms. One or more operatives may be placed at this station for applying goods G, such as prophylactic rubber articles, to forms 34 which are so shaped as smoothly to receive these goods, preferably under a slightly stretched condition so that they lie smoothly and without wrinkles on the forms 34.

Between stations A and B (and corresponding opposite stations) the cam rail 46 (and corresponding rail 47) are so formed as to lower the forms so that they ride with gears 49 on racks 48.

At station B (see Figures 1 and 3 to 8) there is provided an electrical testing unit and device for manifesting defective goods. This unit as best shown in Figures 1 and 3 to 8, inclusive, comprises an electric conductor element 51 which may be connected to a source of high tension electricity as will be described and which is adapted to be engaged by forms 34 carrying rubber goods G and to shape itself about and conform to the shape of the forms along a length of the form and down about the end of the form (Figures 3 and 4). Forms 34 are also electrical conductors connected in the high tension circuit with the element 51 so that a high electrical potential is present between the element 51 and a form 34 thereunder, which are separated only by the non-conducting goods G. This potential is sufficient to leap an air-gap of the thickness of goods G, but not sufficient to pierce the goods, except when the latter have thin spots or are under gauge. Hence goods with the smallest of "pin-holes" or under gauge areas therein will permit a current to flow in the high tension circuit.

Element 51 may be of any suitable electrical conducting material adapted to shape about and conform to the shape of the forms. However, a fine-mesh, flexible fabric of a type which has been often used in women's hand-bags has been found to be the most satisfactory and element 51 as shown comprises a sheet of this material.

The sheet material comprising element 51 has secured along its side or radial edges (with relation to the table) metal binder strips 52 which are secured by screws 52ª to L-shaped supports 53, 53 of rubber covered metal, screws 52ª being secured in the metal of the supports so as to electrically connect element 51 therewith.

The inner ends of strips 52 are downwardly curved as shown (Figure 3) and the material of element 51 is arranged to sag between supports 53 (see Figure 4) so that the material will shape about and conform to a length of the form and the end thereof as shown whereby a "pin-hole" or an under-gauge area anywhere along this length or on the end of the form will be detected by the passage of high potential electricity. The element 51 is short of the upper or mouth end of goods G (Figure 3) by a substantial distance so that the air-gap between element 51 and the bar portion of form 34 is too great for passage of current.

Supports 53 are secured upon a crossbar 54 which is mounted on insulating blocks 55, 55 which are adjustably secured on table 20 by being slotted as at 56, 56 (Figures 1 and 8) and are secured in adjusted positions by screw bolts 57, 57 threaded into table 20. This adjustment provides a means of bringing element 51 into proper relation with the forms 34.

In order to protect operatives from being shocked by accidentally touching element 51, a protective cover plate of glass or other dielectric is mounted on supports 53 (see Figures 3, 4 and 8), as indicated at 58.

Associated with each form bracket 37 is a solenoid-operable magnetic plunger 59 (see Figures 3, 6 and 7) having thereon an outer grooved head 59ʰ projecting outwardly of annulus 22 and which is arranged as shown in Figure 7 to move outwardly from the position there shown under influence of a solenoid, a shoulder at 59ª coming in contact with a shoulder 59ᵇ to limit outward movement and a shoulder 59ᶜ on the head 59ʰ coming in contact with shoulder 59ᵈ to limit inward movement of plunger 59. Head 59ʰ is engageable by a cam 60 (Figures 8, 8ª and 14) after an extended plunger 59 passes station F for returning each plunger. Cam 60 is mounted on a support or bracket 61 extending outwardly from table 20 and then upwardly to the outer side of annulus 22 (see Figure 8ª).

Associated with the element 51 at each station B is a fixed solenoid 62 which may be mounted on a bracket 63 extended outwardly from table 20 under annulus 22 and then upwardly beyond the outer periphery of annulus 22 to align solenoid 62 with the passing magnetic plungers 59. Solenoid 62 is so located as to pull out a plunger when it is energized and just after a form 34 carrying defective goods G passes out of contact with element 51 and before a second form with goods to be tested moves into contact therewith (see chain-dotted positions of spaced forms in Figure 4).

Associated with the equipment at each station B is a normally-closed switch 64 mounted on a pivot 65 and angularly adjustable to a fixed position by a bolt 66 extending through an arcuate slot 67 in a plate 68 on bracket 63. Switch 64 is operable by a button 69 arranged when depressed to open the circuit through the switch and for temporarily depressing button 69 there is a spring arm 70 connected to a lever 71 pivoted at 65 and carrying a cam 72 arranged to be engaged by a projecting plunger head 59$^h$ to swing lever 71 and consequently arm 70 downwardly to depress button 69. An extension 73 on lever 71 has an aperture therein through which loosely extends a screw 74 secured in a lug 75 on plate 68, providing means for limiting swinging movement of lever 71 in either direction.

Station C is provided for discarding defective goods. At this station is a funnel 76, similar in shape to a ship's funnel which extends down through table 20 to a chute receptacle or the like (not shown) where scrap is received and which has a mouth at 77 opening in a direction radially outwardly of table 20 in line with the inner ends of forms 34 as they pass through station C. As best shown in Figures 9, 10 and 11, air-pressure supply nozzle 42 is yieldingly held by springs 78, 78 against the under side of annulus 22 so as to cooperate with ducts 41 and to be in communication with the interior of forms 34 and with the ports or outlets 34$^a$ at their ends, the nozzle 42 being thus yieldingly supported on a bracket 79 and guided for vertical shifting movement as required to ride against the revolving annulus by pins 80, 80 in the nozzle engaged in slots 81 in bracket 79. Bracket 70 extends inwardly under and is secured to table 20. A flexible conduit 82 is connected by a nipple 83 to nozzle 42 and extends to a control valve 84 of a known type which is electrically operable by well-known means housed at 85. A branch supply line 86 is connected to valve 84 and a main air-pressure supply line 87 may be extended down through table 20 (see Figure 2) and may be suitably connected to various branch supply lines such as line 86.

For operating valve 84 to blow a piece of defective goods G off a form 34 as it passes through station C and into the funnel 76, a switch-operating arm 88 is provided having thereon a cam 89 engageable by a passing projecting plunger head 59$^h$ to depress lever or arm 88. Arm 88 is secured on a shaft 90 journaled in a tube 90$^x$ secured in brackets 91, 91 fastened on a plate 91$^a$ in turn secured to the under side of table 20. Fixed on the inner end of tube 90$^x$ is a housing 92 in which are switch contacts 93 and 94, contact 93 being fixed and contact 94 being carried on an arm 95 pivoted at 96 and yieldingly urged toward contact with element 93 by a coil spring as at 97; a pin 98 on arm 95 riding on a cam 99 secured on shaft 90. Shaft 90 (see Figure 11) has secured thereto an arm 100 which is yieldingly urged by spring 101 to hold arm 88 upwardly to be engaged and depressed by a plunger head 59$^h$ and to normally hold cam 99 in a position such that switch contacts 93 and 94 are open as shown, movement of arm 100 and consequently of arm 88 upwardly limited by an adjustable screw 102 threaded through arm 100 and arranged to contact any fixed part such as plate 91$^a$.

The branding device at station D comprises, as best shown in Figures 9, 12 and 13, a stamp 103 arranged on a suitable universal mounting 104 and adjustable to a level position thereon by a screw 105 secured in the back of the stamp 103 in a spherical recess 106 fitting on the corresponding spherical top of the mounting 104, the stamp being secured on its mounting by thumb-nut 107. The stamp 103 is so mounted that forms 34 carrying tested goods G from the discarded station C are rolled over the face of the stamp by rotation of gears 49 by rack 48 and the desired branding on the stamp is applied to the goods. In order to apply ink to the stamp an inking pad 108 may be so secured on an arm 109 in turn secured on a vertically reciprocable rod 110 mounted in a bearing 111 in table 20 and operable by a crank 112, the latter being pivoted at 110$^a$ to rod 110 and secured on a shaft 113 journaled in a tube 114 mounted on brackets 115, 115 on the under side of table 20. Shaft 113 thus extends outwardly to a position under the inner edge of annulus 22 on which is mounted a cam ring 116 formed with spaced relieved portions at 116$^a$, an arm 117 on the outer end of shaft 113 carrying a roller 118 yieldingly held by the weight of the parts, or otherwise, against the lower edge of cam ring 116. Roller 118 is thus arranged to ride up in a relieved place 116$^a$ in cam 116, one being arranged just in advance of each form 34 so as to lower pad 108 onto stamp 103 to ink the stamp just before each piece of goods G are rolled over the stamp. So as not to apply ink by stamp 103 onto an empty form 34 from which defective goods has been blown at station C, plunger head 59$^h$, which is still extended as the form on which defective goods was found passes from station C, is arranged to come into contact with a cam 119 on an arm 120 secured on a shaft 121, journaled in a tube 121$^a$ supported in a manner similar to tube 90$^x$, in advance of movement of an empty form 34 to the branding device (see Figure 9) and shaft 121 extends to and operates a switch 122 similar to switch 93—94 in housing 92, the switch operable by shaft 121 controlling flow of electricity to a solenoid at 123 operating a core or plunger 124 connected at 125, 125 to a vertically reciprocable member 126 journaled at 127 on table 20 and carrying on its upper end a track 128 with ramps at 129 and 130 whereby upon passing of an empty form 34 to the branding device track 124 will be raised into the path of the forms and the empty form will roll up ramp 129 along track 128 and down ramp 130 to pass over but not contact stamp 103. Cam 119 is of the substantial length shown to hold solenoid 123 energized from a time just before passage of an empty form to station D until the time said form has passed from station D.

Station F merely is a location where forms 34 are elevated as shown and one or more operatives here may strip the goods G from the forms by reversely rolling them upon themselves from their open ends.

The equipment at station F is designed automatically to remove the tested and branded goods from the machine as shown best in Figures 14, 15 and 16 and comprises a funnel 131 similar to funnel 77 but arranged with its mouth to receive goods blown from forms 34 while said forms are extended inwardly and upwardly (see Figures 1, 2, 15 and 16) the forms passing through this station being held upwardly by cam rail 48 acting on rollers 45 on plungers 43 as has been described. Nozzle 42$^a$ is similar to nozzle 42 and is suitably controlled to blow air into the forms by substantially identically the same kind of mechanism as associated with nozzle 42. The corresponding parts have applied thereto the same reference numerals with the added exponent "a." One difference, however, is that cam 89ª and lever 88ª are adjustable between positions such as the full-line positions of Figures 14, 15 and 16 to the dotted-line positions thereof shown in Figure 16 so that the use of the equipment at station F may be optional, lever 88ª and cam 89 being shifted out of a position in which the cam can be engaged by plunger heads 59ʰ. Moreover, in the full-line positions shown the cam 89ª is engaged by plunger heads 59ʰ of plungers which have not been drawn outwardly by solenoid 62 and which carry, therefore, perfect tested and branded goods.

To make arm 88ª adjustable on its shaft 90ª, the outer end of shaft 90ª has secured thereto a sleeve 132 (see Figure 16) in which is longitudinally shiftable a shaft 133 carrying in a socket 134 an outwardly spring pressed ball 135 for locking shaft 133 to sleeve 132 in either of two longitudinal positions by engagement with apertures 136 and 137 in sleeve 132. Shaft 133 carries arm 88ª and said shaft is arranged to be shifted carrying the arm with it, by means of a knob 138 connected to shaft 133 and extended to the outside of the machine for manual operation. A pin 139 secured to arm 88ª extends through a flange 140 on sleeve 132 and has a shoulder 139ª thereon to limit outward shifting of arm 88ª.

The electrical connections to the simple solenoid-operated valves and their control switches such as valve 84—85 and switch 93—94 will be well understood by skilled artisans. Figure 17, however, illustrates the electrical connections for the testing device at station B and the solenoid for operating plungers 59. A brief description of this diagram follows in the next paragraphs.

An ordinary source of A. C. electricity is connected to a transformer T—1 designed to produce a high tension current of low amperage, one high tension lead for transformer T—1 being connected through suitable resistance R—1 to retard current flow to the metallic fabric mesh 51. The other side of transformer T—1 is connected at station B through a suitable resistance R—2 to the forms 34 (as for example through rack 48 and gears 49) and to the ground (e. g. grounded on the machine).

One line of a shunt off the grounded high tension line of the transformer (which is connected to the forms) conveys a current through a suitable resistance R—3 to the grid of a trigger tube X and the other line of the shunt connects to the filament circuit of that tube which extends to the output side of a suitable transformer T—2 also connected to an ordinary power source on its input side. The plate of tube X is connected through suitable resistance R—4 to one side of the solenoid or electromagnet 62, a shunt S containing reactance being provided across the coil of solenoid 62. The other side of solenoid 62 is connected through switch 64 to one side of a suitable rectifier Y, the other side of the rectifier Y being connected to the output circuit of transformer T—2 supplying the filament of tube X. A suitable reactance S—1 may be arranged across the rectifier Y which may be connected through a suitable transformer T—3 with an ordinary source of A. C. electricity. A shunt S—2 across the filament and plate of tube X contains a suitable resistance and condenser in parallel.

The foregoing circuit and associated instrumentalities are so connected that so long as the grid of tube X is not energized by passage of current through the grid, no D. C. electricity can flow from rectifier Y across filament and plate and through solenoid 62 which remains unenergized. Upon the flow of current through the grid in the A. C. circuit including transformer T—1, element 51 and a form 34, even though this flow is of very short duration, a D. C. current flow is established from rectifier Y across the filament and plate and energizes solenoid 62, and even after discontinuance of the A. C. flow, this D. C. flow continues until the D. C. circuit is broken. Thus solenoid 62 is energized when a hole or under-gauge area is found in goods G and remains energized from that instant until the form carrying such goods passes from engagement with element 51, thus the solenoid draws out a plunger 59, the head 59ª of which immediately actuates switch 64 opening the D. C. circuit before a succeeding form 34 engages element 15 and thereby setting the circuit in its original condition for subsequent testing of the passing goods.

In the operation of the device, an operative or operatives standing at stations A will slip the goods G to be tested over the forms 34, the forms then extending inwardly and upwardly to facilitate these operations. The forms then pass to stations B and as they do so swing downwardly to inwardly-extending horizontal positions in which they pass under element 51 which shapes itself to conform to the shape of the forms. The forms are so spaced that only one form can be in contact with the element 51 at any given time.

If perfect goods are on the forms, these will prevent the passage of a high tension current between element 51 and the forms and will pass along for succeeding operations in the machine. If, however, imperfect goods are on the forms, these permit the flow of electricity in the A. C. circuit and cause the solenoid 62 to be energized and to remain so until the form with imperfect goods passes out of contact with element 51 whereby upon passing solenoid 62, the plungers 59 will first be drawn outwardly and then (before a succeeding form reaches element 51) plungers 59 engage and open switch 64, deenergizing the solenoid 62 and setting the testing circuit for testing goods on succeeding forms.

Perfect goods on forms 34 will then pass to the branding device at station D where they will roll over the stamp 103 and will be branded as will be understood, the stamp being intermittently inked between passage of the forms. Imperfect goods, however, will, because of the extension or projection of plungers, 59, be blown off the forms into funnel 76 at station C and plungers 59 cause the track 128 to be elevated as empty forms pass from station C to station D whereby the empty forms will roll over the stamp 103 without contacting the same.

If rolled goods are required one or more operatives may be arranged at station E to roll tested goods off the forms. If flat-packed or bulk goods are desired, knob 138 which is pulled out to prevent operation of the equipment at station F is shoved in (see Figure 16) to set this equipment in operation so that the perfect tested goods will be blown off forms 34 into funnel.

It is to be understood that the equipment at each of the stations may be independently used in this or similar machinery and hence the present invention contemplates the use of any one or more of the features separately or in various combinations for the same or similar purposes. It will be understood also that modifications of the invention may be resorted to without departing from the spirit thereof or the scope of the appended claims.

What is claimed is:

1. Apparatus of the class described comprising the combination in a device for testing thin hollow flexible rubber articles, of electrical means for testing a series of articles in succession and including a series of forms for the articles on which they may be supported in distended unwrinkled condition, means for conveying the forms, and an electrical element with which the forms cooperate in succession to contact the articles thereon, mechanical means responsive to and operable by said electrical means to manifest the presence of defective goods on the forms, means operable by said mechanical means on the forms in succession after testing to discharge defective goods from the forms, and other means also operable by said mechanical means after testing for discharging perfect goods from said forms.

2. That method for testing thin flexible hollow rubber goods or the like for defects, which comprises providing smooth electro-conductive rotatable forms on which the goods may be slipped under sufficient tension to hold them distended without wrinkling, fitting the goods over said forms, applying an electro-conductive element to the surfaces of the goods on the forms, rotating the forms while contacting said element, and maintaining a high potential of electricity between said element and said forms sufficient to leap an air gap comparable with the thickness of the goods but insufficient to pierce goods of normal thickness.

3. That method for testing thin hollow flexible rubber articles or the like for defects, which comprises fitting such articles over a rotatable form of electro-conductive material, said form distending the articles so as not to have wrinkles therein, applying an element of electro-conductive material about said articles which shapes about and conforms to the surfaces of the goods on the forms, rotating the form while in contact with said element, and maintaining a high electric potential between said element and said form sufficient to leap an air gap comparable with the thickness of the goods but insufficient to pierce goods of normal thickness.

4. Apparatus for testing thin hollow flexible rubber goods or the like for defects, comprising an electro-conductive form for fitting the goods thereon to hold the same distended without wrinkles, an electro-conductive element applicable to the surface of said goods on the form, means for rotating said form while in contact with said element, and means for establishing a high potential of electricity between said element and said support sufficient to leap an air gap comparable with the thickness of the goods but of insufficient potential to pierce goods of normal thickness.

5. Apparatus for testing thin hollow flexible rubber articles or the like comprising an electro-conductive form on which the article may be fitted in distended unwrinkled condition, an element of electro-conductive material applicable to said form and shaping about and conforming to the surface of the article on the form, means for rotating said form while in contact with said element, and means for maintaining a high potential of electricity between said element and said form sufficient to leap an air gap comparable to the thickness of the article but of insufficient potential to pierce an article of normal thickness.

6. Apparatus for testing thin flexible hollow rubber goods or the like for defects comprising an electro-conductive form for fitting the goods thereon in distended unwrinkled condition, an electro-conductive element applicable to the surface of said goods and conforming to the shape of the form, means for rotating said form while in contact with said element, means for establishing a high potential of electricity between said element and said form sufficient to leap an air gap comparable with the thickness of the goods but of insufficient potential to pierce goods of normal thickness, and means for manifesting the passage of electrical current between said elements.

7. Apparatus for testing thin hollow flexible rubber articles or the like each of which has a closed end comprising an electro-conductive form on which the article may be placed in distended unwrinkled condition, said form having an end over which the closed end of the article is supported, an element of electro-conductive material applicable to said form and shaping about and conforming to the surface including the closed end of the article on the form, and means for maintaining a high potential of electricity between said element and said form sufficient to leap an air gap comparable to the thickness of the article but of insufficient potential to pierce an article of normal thickness, said element comprising a flexible, metallic mesh fabric, and means for mounting said fabric in sagging condition, whereby it will shape about a side and closed end of the article.

8. Apparatus as set forth in claim 5, comprising a series of such forms, and means for conveying said forms in succession into association with said element.

9. Apparatus as set forth in claim 7, comprising a series of such forms, means for moving said forms in succession in association with said element, and means for rotating said forms while they pass in contact with said element to test the articles all about the forms.

JOHN R. GAMMETER.